US012387627B2

(12) United States Patent
Crawley et al.

(10) Patent No.: US 12,387,627 B2
(45) Date of Patent: Aug. 12, 2025

(54) SIGN KIT FOR A BARRIER

(71) Applicant: Tensator Group Ltd, Milton Keynes (GB)

(72) Inventors: Peter James Crawley, Milton Keynes (GB); Alan Robert McPherson, Milton Keynes (GB)

(73) Assignee: TENSATOR GROUP LTD (GB)

( * ) Notice: Subject to any disclaimer, the term of this patent is extended or adjusted under 35 U.S.C. 154(b) by 504 days.

(21) Appl. No.: 17/839,749

(22) Filed: Jun. 14, 2022

(65) Prior Publication Data

US 2022/0406225 A1 Dec. 22, 2022

(30) Foreign Application Priority Data

Jun. 16, 2021 (GB) ...................................... 2108551

(51) Int. Cl.
*G09F 7/18* (2006.01)
*E01F 13/02* (2006.01)

(52) U.S. Cl.
CPC .............. *G09F 7/18* (2013.01); *E01F 13/022* (2013.01); *G09F 2007/1856* (2013.01)

(58) Field of Classification Search
CPC ....... E01F 13/02; E01F 13/022; E01F 13/028; G09F 7/18; G09F 7/1804; G09F 7/06; G09F 7/12; G09F 2007/1856; G09F 2007/127
See application file for complete search history.

(56) References Cited

U.S. PATENT DOCUMENTS

| | | | | | |
|---|---|---|---|---|---|
| 1,882,150 | A * | 10/1932 | Kent | E01F 13/02 52/646 |
| 4,866,866 | A * | 9/1989 | Rotter | G09F 15/0062 40/610 |
| 5,212,898 | A * | 5/1993 | Dinan | G09F 7/18 411/908 |

(Continued)

FOREIGN PATENT DOCUMENTS

| | | | |
|---|---|---|---|
| DE | 2328649 | A1 * | 1/1975 |
| DE | 102018132494 | A1 | 6/2020 |

(Continued)

OTHER PUBLICATIONS

Search Report Under Section 17, dated Dec. 16, 2021, issued in corresponding UK Application No. GB2108551.9.

(Continued)

*Primary Examiner* — Jonathan P Masinick
(74) *Attorney, Agent, or Firm* — OSTROLENK FABER LLP

(57) ABSTRACT

A sign kit that includes a first barrier post, a second barrier post, a barrier member extending between the first post and the second post, and a sleeve for the barrier member, the sleeve being planar and rectangular and having a first end, a second end opposing the first end, a first edge extending from the first end to the second end, a second edge extending from the first end to the second end, an inner side, and an outer side. A fold line is formed along the sleeve extending parallel to the first edge and the second edge and from the first end to the second end. A fixing is provided adjacent the first edge for fixing the first edge to the second edge or to the inner side of the sleeve. Graphics are provided on the outer side of the sleeve to provide information or advertising.

8 Claims, 2 Drawing Sheets

(56) References Cited

U.S. PATENT DOCUMENTS 6,684,619 B2 * 2/2004 Hara ..................... E01F 13/028 59/92
8,777,512 B2 * 7/2014 Henderson .............. E01F 13/02 116/63 P
10,794,022 B2 * 10/2020 Reiner .................. E01F 13/022
2003/0213887 A1 11/2003 Domasin ....................... 248/473
2004/0173785 A1 * 9/2004 Russo ................... E01F 13/028 256/1
2006/0076544 A1 * 4/2006 Kurple .................... E01F 9/654 256/26
2007/0039219 A1 * 2/2007 Wallace .................... G09F 3/12 40/645
2009/0119961 A1 * 5/2009 Harms ................ G09F 15/0025 40/607.05
2010/0176543 A1 * 7/2010 Burke ................. E04H 12/2292 267/153
2013/0095273 A1 * 4/2013 Rinaudo ................... G09F 7/18 40/299.01
2013/0255122 A1 10/2013 Henderson ................. 40/606.03
2013/0269229 A1 * 10/2013 Rodriguez-Aparicio, Sr. ............. G09F 17/00 40/607.13
2016/0047953 A1 * 2/2016 Crawley ................ G02B 5/136 256/65.02
2019/0063018 A1 2/2019 Reiner

FOREIGN PATENT DOCUMENTS

FR 2516565 A1 5/1983
FR 3068744 A1 * 1/2019
GB 2583700 A * 11/2020 ............ E01F 13/022
KR 20060105946 A * 10/2006
KR 20120029093 A * 3/2012
KR 20130052156 A * 5/2013
KR 101302731 B1 * 9/2013
KR 200471515 Y1 * 2/2014

OTHER PUBLICATIONS

European Search Report, dated Nov. 2, 2022, issued in corresponding European Patent Application No. 22 178 349.1.

* cited by examiner

SIGN KIT FOR A BARRIER

CROSS-REFERENCE TO RELATED APPLICATION

The present application claims priority to United Kingdom Patent Application No. GB 2108551.9, filed Jun. 16, 2021, the content of which is incorporated herein by reference.

FIELD OF THE INVENTION

The present invention relates to temporary or semi-permanent barriers formed between barrier posts, such as those used to form barriers in retail outlets and airports. In particular, the present invention relates to the provision of signs and advertising on the barriers formed between the barrier posts.

BACKGROUND OF THE INVENTION

Barriers comprising barrier posts and barrier members extending between the barrier posts are commonly used as part of crowd control and queue management. For example, portable or fixed barrier posts with extendable or rigid barrier members are commonly used to control queues at airports and at retail outlets. The barrier posts have one or more barrier members extending between the posts to direct a queue. Some such barrier members are extendable from the barrier post. Alternative barrier members are rigid members that are permanently or removably attached to the barrier posts. Most barrier posts either have one or more barrier member extending from an upper end or one or more means for mounting barrier posts formed at an upper end.

It is often desirable to provide graphics on the barrier members, for example advertising, customer information, or directions to people using a queueing system. Currently this can be provided by providing sign members on the barrier posts, by providing completely separate signage, or by printing graphics directly on to the barrier member.

It is desirable to provide graphics directly onto barrier members and this has been done in certain circumstances. However, printing directly on barrier members can be difficult and expensive. Further, if it is necessary to change the graphics on a barrier member it becomes necessary to completely replace the barrier member, which can be difficult if not impossible. For example, replacing an extendable barrier member is difficult and it can be simpler to replace the barrier post.

In light of the above there is a need for a simple and cost effective way of displaying graphics on barrier members that does not involve printing the graphics directly on the barrier member.

SUMMARY OF THE INVENTION

The present invention provides a sign kit for a barrier consisting of:

a first barrier post;

a second barrier post;

a barrier member extending between the first barrier post and the second barrier post; and a sleeve for a barrier member, the sleeve being planar and rectangular and having a first end, a second end opposing the first end, a first edge extending from the first end to the second end, a second edge extending from the first end to the second end, an inner side, and an outer side;

wherein:

a fold line is formed along the sleeve extending parallel to the first edge and the second edge and from the first end to the second end;

a fixing provided adjacent the first edge for fixing the first edge to the second edge or to the inner side of the sleeve;

graphics are provided on the outer side of the sleeve; and wherein:

the sleeve member is mounted around the barrier member and completely encloses the barrier member between the first end of the sleeve and the second end of the sleeve;

characterised in that a maximum width of the sleeve is no greater than 250% of a width of the barrier member.

The sign kit of the present invention is advantageous in that it provides a simple and cost-effective way to display graphics on a barrier member, without requiring the graphics to be printed or otherwise directly displayed on the barrier member. The sleeve can be easily mounted over the barrier member and removed therefrom. This allows graphics to be changed in a simple manner. Graphics that might be displayed on a barrier include public information, adverts, customer information, or warnings. Any information that a person might wish to display on a barrier can be included on the barrier member.

Within the meaning of the present invention a barrier post may either be a standalone post or it may be a portion of a wall or other structural feature that can operate in the same manner as a standalone post. For example, in embodiments of the invention the first barrier post and/or the second barrier post may be a wall or other similar structural feature to which a barrier member may be mounted.

In order to mount the sleeve on a barrier member the sleeve is folded along the fold line and positioned over the barrier member. The fixing is then used to fix the first edge of the sleeve to the second edge such that the sleeve is positioned around the barrier member. As will be readily appreciated, a length of the barrier member must be at least as long as a length of the sleeve from the first end to the second end. Further a width of the barrier member must be less than a width of the sleeve from the fold line to the first edge and from the fold line to the second edge.

The length of the sleeve from the first end to the second end may be at least 75%, at least 80%, at least 85%, at least 90%, or at least 95% of the length of the barrier member.

The width of the sleeve from the fold line to the first edge and the from the fold line to the second edge must be more than the width of the barrier member. That is, an internal width of the sleeve must be greater than a width of the barrier member around which the sleeve is mounted. This internal width may be at least 110%, at least 120%, at least 130%, at least 140% or at least 150% of the width of the barrier member. Standard widths of barrier members include 50 mm, 100 mm and 150 mm. A 50 mm wide barrier member may be used with a sign member having any internal width greater than 50 mm, including but not limited to 55 mm, 60 mm, 65 mm, 70 mm, 75 mm, 80 mm, 95 mm or 100 mm. A 100 mm wide barrier member may be used with a sign member having any internal width greater than 100 mm, including but not limited to 110 mm, 120 mm, 130 mm, 140 mm, 150 mm, or 160 mm. A 150 mm wide barrier member may be used with a sign member having any internal width greater than 150 mm, including but not limited to 160 mm, 170 mm, 180 mm, 190 mm, 200 mm, or 210 mm. A barrier member may be used with a sign member having an internal width at least 5 mm, at least 10 mm, at least 15 mm, at least 20 mm, at least 25 mm, at least 30 mm, at least 35 mm, at least 40 mm, at least 45 mm, or at least 50 mm more than the width of the barrier member.

The sign kit of the present invention is intended to be mounted securely over a barrier member as a simple and cost-effective alternative to providing graphics directly on the barrier member. On that basis, it is advantageous that the sleeve closely conforms to the barrier member and is not significantly wider than the barrier member. For this reason the sleeve is advantageously no more than 250% of the width of the barrier member. In embodiments of the invention the sleeve may have a width of no more than 225%, 200%, 175%, 150%, 125%, or 110% of the width of the barrier member.

Generally, the fold line will be positioned centrally along the sleeve such that a first width from the fold line to the first edge is equal to a second width from the fold line to the second edge. This ensures that when the sleeve is folded along the fold line the first edge is coincident with the second edge and the fixing can be used to attach the first edge to the second edge. Alternatively, the fold line may be positioned closer to the first edge than the second edge such that the first width is less than the second width. This allows the fixing to fix the first edge to the inner side of the sleeve when the sleeve is folded along the fold line.

The fixing of the sleeve may comprise any suitable means of fixing the first edge to the second edge or to the inner side of the sleeve. In embodiments of the invention the fixing may comprise an adhesive strip formed on an inner side of the sleeve adjacent to the first edge. If the fixing comprises an adhesive strip a cooperative portion may be formed on an inner side of the sleeve between the fold line and the second edge for adhering to the adhesive strip. The cooperative portion may comprise an adhesive portion or a surface coating that is formed of a material to which an adhesive strip may securely adhere.

In embodiments of the invention the fixing may comprise one or more tabs located at the first edge and cooperative slots formed adjacent the second edge, through which the one or more tabs can be located to fix the first edge to the inner side of the sleeve. Further fixings will be apparent to the person skilled in the art, for example, hook and loop fastenings, staples, and adhesive tape, all such fixings are within the scope of the present invention.

The fold line of the present invention may be formed in any manner apparent to the person skilled in the art. In embodiments of the invention the fold line may not be marked but may simply be formed by a user carefully folding the sleeve when it is put into use. In embodiments the fold line may simply be graphically indicated on the inner and/or outer surface of the sleeve. Alternatively or additionally, the fold line may be partially scored through the outer side and/or inner side of the sleeve. Alternatively or additionally, the fold line may comprise one or more perforations through the outer side and/or inner side of the sleeve or through the thickness of the sleeve. Partially scoring the fold line and/or perforating the fold line may be advantageous as it can allow the sleeve to be folded more easily and accurately than is possible if the fold line is graphically indicated or is formed by a user folding the sleeve.

The sleeve may be formed of any suitable material. As the sleeve does not have to support any weight other than its own when it is in use the material from which the sleeve is formed may be simple lightweight material that is not necessarily particularly robust, for example paper. Advantageously the sleeve will be formed from a material that is easy to print graphics upon. It may be advantageous that the sleeve is formed of robust material that can withstand prolonged use and knocks from people queueing or leaning on the barrier member. For example, the barrier member may be formed of card or plastic. Suitable robust materials will be immediately apparent to the person skilled in the art.

The first and second barrier posts may be any barrier post suitable for use in a queuing or crowd control system as discussed above in the background to the invention. The barrier member may be any suitable barrier member that can be mounted or extended between the first barrier post and the second barrier post. Suitable barrier posts and barrier members will be apparent to the person skilled in the art.

In embodiments of the invention the barrier member may be an extendable barrier tape that is extended from the first barrier post to a suitable mounting on the second barrier post and held in between the first barrier post and the second barrier post by said mounting. Alternatively, the barrier member may be a rigid barrier member that is removably or permanently mounted between the first barrier post at a first end and the second barrier post at the second end.

The sign kit of the present invention is used by positioning the barrier member between the first barrier post and the second barrier post to extend therebetween. Subsequently the sleeve is folded along the fold line, positioned around the barrier member, and the fixing is used to fix the first edge of the sleeve to the second edge or the inner side of the sleeve such that the sleeve is securely mounted around the barrier member and the graphics on the outer side of the sleeve are displayed on the barrier member.

Further features and advantages of the invention will be apparent from the preferred embodiments of the invention described below and shown in the Figures.

DRAWINGS

Figure 1:
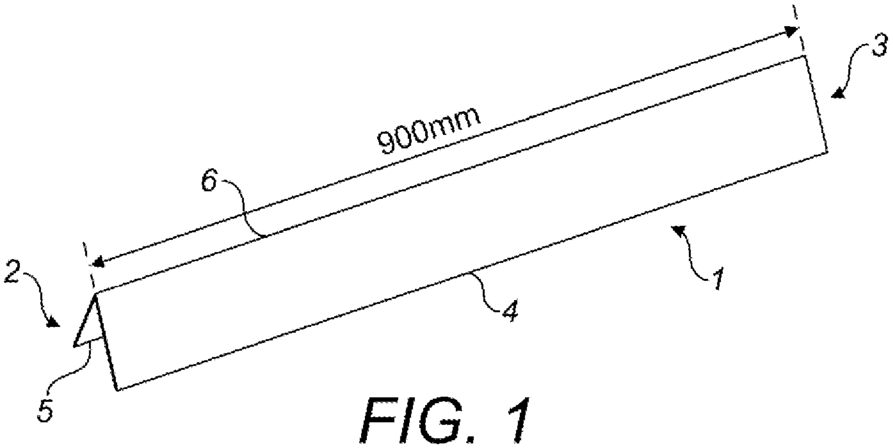
FIG. 1 is a first schematic of a sleeve of a sign kit according to the present invention.
Figure 2:
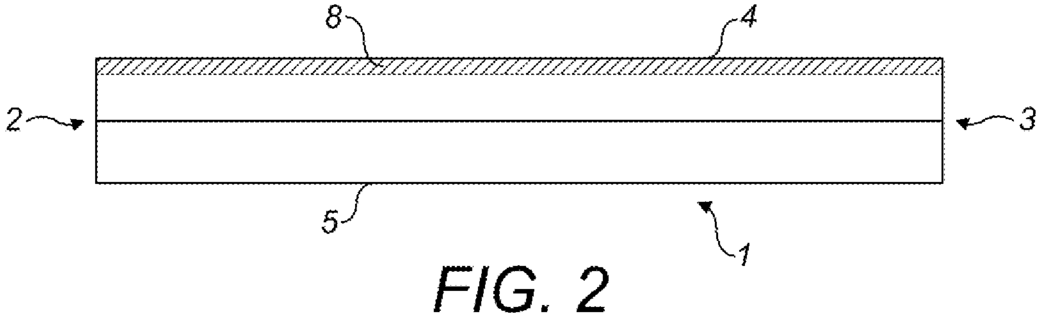
FIG. 2 is a second schematic of the sleeve of FIG. 1 showing the inner side of the sleeve.
Figure 3:
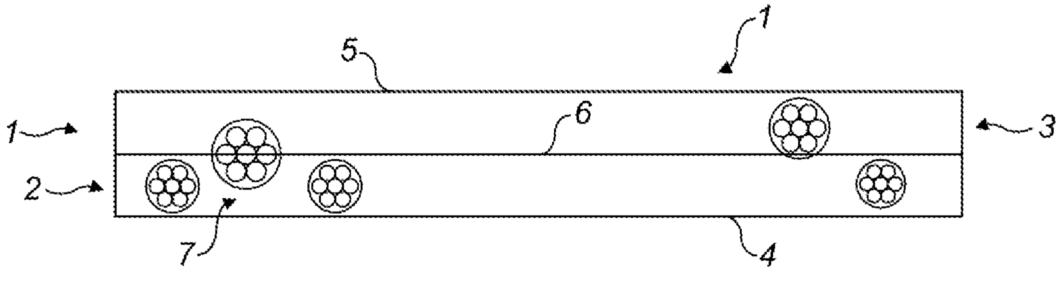
FIG. 3 is a third schematic of the sleeve of FIG. 1 showing the outer side of the sleeve.

A sleeve 1 of a sign kit according to the present invention is shown in FIGS. 1 to 3. The sleeve 1 is shown folded in FIG. 1. An inner side of the unfolded sleeve 1 is shown in FIG. 2. An outer side of the unfolded sleeve 1 is shown in FIG. 3. The sleeve has a first end 2, a second end 3, a first edge 4 extending from the first end to the second end, a second edge 5 extending from the first end to the second end, and a fold line 6 extending from the first end to the second end. Graphics 7 are printed on the outer side of the sleeve. An adhesive strip 8 is formed on the inner side of the sleeve adjacent the first edge 4. The adhesive strip 8 extends adjacent the first edge from the first end 2 to the second end 3. The fold line 6 is formed as a perforated line. The sleeve 1 is formed of a flexible but robust polymer. Suitable polymers will be apparent to the person skilled in the art.

Figure 4:
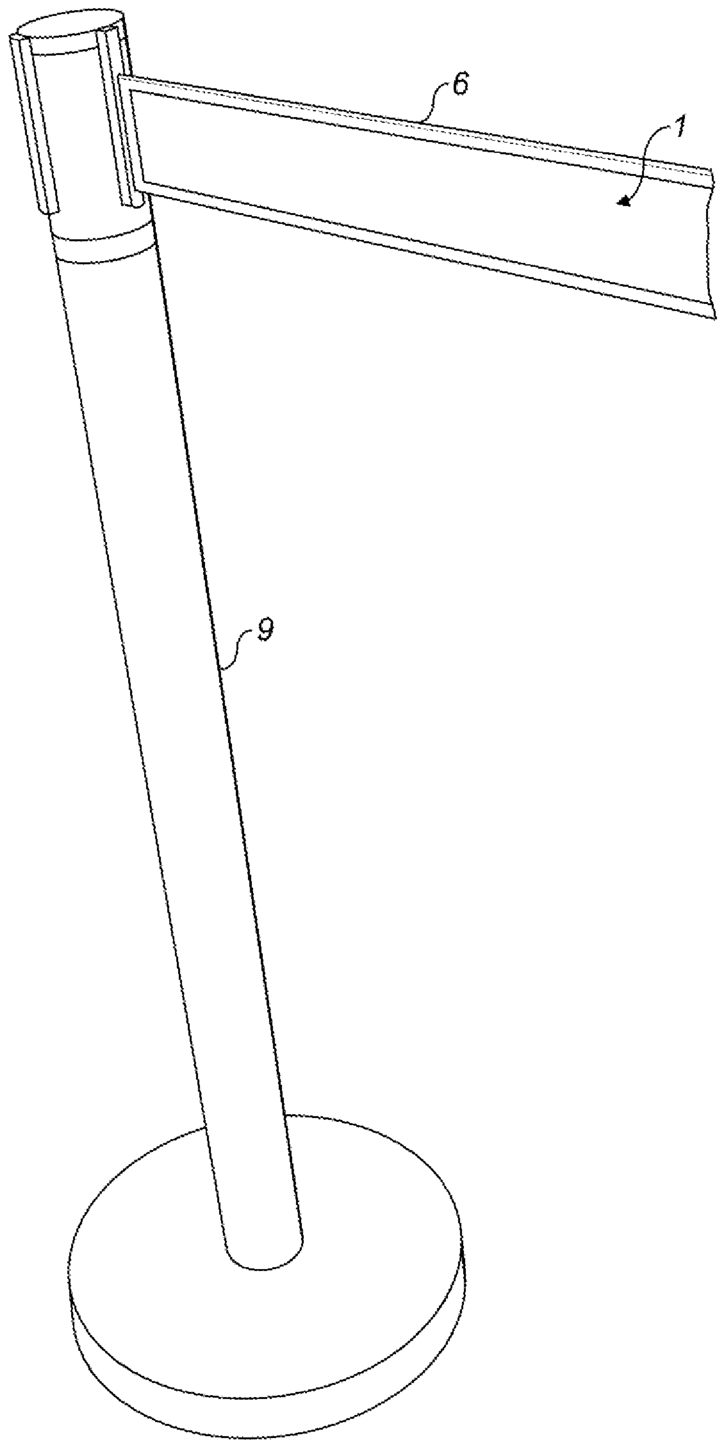
FIG. 4 is an image of a sign kit according to the present invention including the sleeve of FIGS. 1 to 3.

FIG. 4 shows the sleeve 1 mounted on a barrier member (not shown) as part of a sign kit according to the present invention. The sleeve 1 completely surrounds the barrier member such that graphics 8 on the outer side of the sleeve 1 are visible. The barrier member extends from an upper end of a barrier post 9. As can be seen from FIG. 4, the barrier post 9 is a conventional mobile barrier post that is commonly used in airport and retail queueing systems. The barrier member is an extendable barrier tape that extends from an upper end of the barrier post 9 and is mounted at an outer end to a second barrier post 9 (not shown).

The sign kit is used in the following manner. Before use the sleeve 1 is a planar rectangular member. The sleeve 1 is folded along the fold line 6, as shown in FIG. 1. The sleeve 1 is then positioned over a barrier member and the sleeve is pressed together such that the adhesive strip 8 adheres to the opposing part of the sleeve 1 adjacent the second edge 5. As will be immediately apparent, in order to allow this to secure the adhesive strip 8 to adhere to the opposing part of the sleeve 1 it is necessary that a width of the sleeve 1 from the fold line 6 to the adhesive strip 8 is equal to or greater than a height of the barrier member. As will be readily understood, in all embodiments of the invention it is necessary that the sleeve 1 is sized to allow it to completely extend around the barrier member. When the sleeve 1 is mounted around the barrier member the graphics 7 are displayed on the outer side of the sleeve 1 and are clearly visible.

The embodiment of the invention shown in the Figures are considered to be exemplary only and are not limiting on the scope of the present application. The scope of the present application is defined in the claims. Unless indicated otherwise by the claims or elsewhere in the description, any feature of the embodiment of the invention shown in the Figures can be incorporated in an embodiment of the invention independently from any other feature.

The invention claimed is:

1. A sign kit for a barrier consisting of:

a first barrier post;

a second barrier post;

a barrier member extending between the first barrier post and the second barrier post; and a sleeve for a barrier member, the sleeve being planar and rectangular and having a first end, a second end opposing the first end, a first terminal edge extending from the first end to the second end, a second terminal edge extending from the first end to the second end, an inner side, and an outer side; wherein:

a fold line is formed along the sleeve extending parallel to the first terminal edge and the second terminal edge and from the first end to the second end;

a fixing provided adjacent the first terminal edge for fixing the first terminal edge to the second terminal edge or to the inner side of the sleeve;

graphics are provided on the outer side of the sleeve;

the sleeve member is mounted around the barrier member and completely encloses the barrier member between the first end of the sleeve and the second end of the sleeve;

the mounted sleeve is rectangular and has a length along the fold line and a width transverse to the length thereof that extends from the fold line to the first and second terminal edges; and the width of the mounted sleeve is no greater than 250% of a width of the barrier member to which the sleeve is mounted.

2. The sign kit for a barrier according to claim 1, wherein the fixing comprises an adhesive strip.

3. The sign kit for a barrier according to claim 1, wherein the fixing comprises one or more tabs and cooperative slots are formed adjacent the second edge.

4. The sign kit for a barrier according to claim 1, wherein the fold line is perforated to facilitate folding of the sleeve.

5. The sign kit for a barrier according to claim 1, wherein the sleeve member is formed of card.

6. The sign kit for a barrier according to claim 1, wherein the sleeve is formed from plastic.

7. The sign kit for a barrier according to claim 1, wherein the barrier member is an extendable barrier tape.

8. The sign kit for a barrier according to claim 1, wherein the barrier member is a rigid barrier mounted between the first barrier post and the second barrier post.

* * * * *